United States Patent [19]
Jarvis

[11] 3,961,134
[45] June 1, 1976

[54] BI-LEVEL DISPLAY SYSTEM

[75] Inventor: John Frederick Jarvis, Fair Haven, N.J.

[73] Assignee: Bell Telephone Laboratories, Incorporated, Murray Hill, N.J.

[22] Filed: May 9, 1975

[21] Appl. No.: 576,163

[52] U.S. Cl. .......................... 178/7.3 D; 315/169 TV
[51] Int. Cl.² ............................................. H04N 5/66
[58] Field of Search ....... 178/7.3 D, 7.5 D, DIG. 34; 315/169 TV; 340/324 R, 324 M

[56] References Cited
UNITED STATES PATENTS

| | | | |
|---|---|---|---|
| 3,647,958 | 3/1972 | Sobel | 178/7.3 D |
| 3,843,959 | 10/1974 | Owaki et al. | 178/7.3 D |
| 3,845,243 | 10/1974 | Schmersal et al. | 178/7.3 D |

OTHER PUBLICATIONS
I.E.E.E. Transactions on Computers vol. 23, Feb. 1974, pp. 184–186.

*Primary Examiner*—Robert L. Richardson
*Attorney, Agent, or Firm*—Barry H. Freedman

[57] ABSTRACT

Continuous tone images are displayed on a bi-level display device by establishing thresholds for each display element and actuating a particular element when its intensity $\phi$ bears a predetermine relationship to the established threshold. Thresholds $\phi_T$ are established by determining the average intensity $\overline{\phi}$ of picture elements in the neighborhood of a particular display element, and by constraining the average to a narrower range according to a single value function of $\overline{\phi}$ such as $$\phi_T = \gamma + (1 - 2\gamma/\phi_{max})\,\overline{\phi},$$

where $\phi_{max}$ is the maximum intensity possible and $\gamma$ is a constant which can be determined subjectively or which can be related to the noise in the picture area.

41 Claims, 13 Drawing Figures

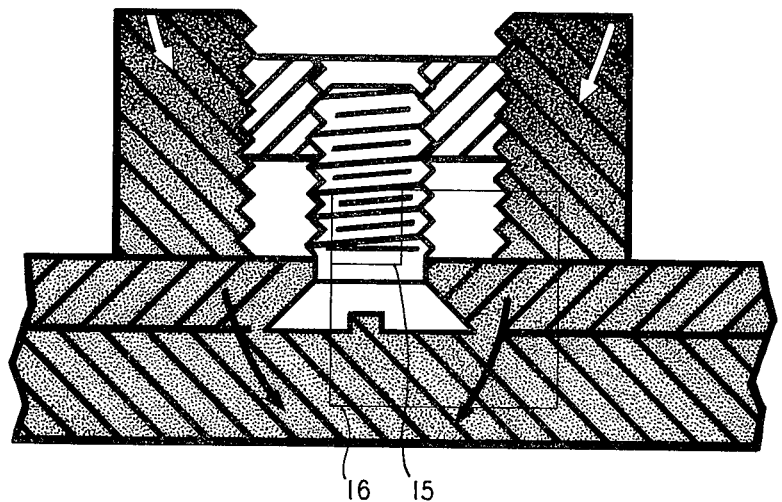

| $A_1$ | $A_2$ | $A_3$ | $A_4$ | $A_5$ | $A_6$ | $A_7$ | $A_8$ | $A_9$ | $A_{10}$ |
|---|---|---|---|---|---|---|---|---|---|
| $B_1$ | $B_2$ | $B_3$ | $B_4$ | $B_5$ | $B_6$ | $B_7$ | $B_8$ | $B_9$ | $B_{10}$ |
| $C_1$ | $C_2$ | $C_3$ | $C_4$ | $C_5$ | $C_6$ | $C_7$ | $C_8$ | $C_9$ | $C_{10}$ |
| $D_1$ | $D_2$ | $D_3$ | $D_4$ | $D_5$ | $D_6$ | $D_7$ | $D_8$ | $D_9$ | $D_{10}$ |
| $E_1$ | $E_2$ | $E_3$ | $E_4$ | $E_5$ | $E_6$ | $E_7$ | $E_8$ | $E_9$ | $E_{10}$ |
| $F_1$ | $F_2$ | $F_3$ | $F_4$ | $F_5$ | $F_6$ | $F_7$ | $F_8$ | $F_9$ | $F_{10}$ |
| $G_1$ | $G_2$ | $G_3$ | $G_4$ | $G_5$ | $G_6$ | $G_7$ | $G_8$ | $G_9$ | $G_{10}$ |
| $H_1$ | $H_2$ | $H_3$ | $H_4$ | $H_5$ | $H_6$ | $H_7$ | $H_8$ | $H_9$ | $H_{10}$ |
| $I_1$ | $I_2$ | $I_3$ | $I_4$ | $I_5$ | $I_6$ | $I_7$ | $I_8$ | $I_9$ | $I_{10}$ |
| $J_1$ | $J_2$ | $J_3$ | $J_4$ | $J_5$ | $J_6$ | $J_7$ | $J_8$ | $J_9$ | $J_{10}$ |

FIG. 3

| 171 | 156 | 156 | 114 | 108 | 75 | 60 | 42 | 30 | 30 |
|---|---|---|---|---|---|---|---|---|---|
| 42 | 30 | 39 | 42 | 39 | 54 | 66 | 87 | 78 | 111 |
| 144 | 153 | 159 | 186 | 213 | 198 | 186 | 192 | 201 | 210 |
| 204 | 192 | 183 | 198 | 195 | 180 | 174 | 159 | 150 | 111 |
| 192 | 66 | 57 | 51 | 30 | 36 | 24 | 36 | 27 | 36 |
| 186 | 48 | 51 | 48 | 75 | 99 | 123 | 156 | 153 | 168 |
| 192 | 186 | 192 | 174 | 183 | 207 | 192 | 183 | 192 | 186 |
| 144 | 132 | 114 | 87 | 75 | 54 | 60 | 36 | 42 | 24 |
| 42 | 18 | 39 | 30 | 33 | 66 | 45 | 54 | 66 | 81 |
| 156 | 177 | 183 | 183 | 192 | 201 | 189 | 204 | 195 | 198 |

FIG. 5

| 130 | 135 | 128 | 124 | 114 | 111 | 106 | 104 | 106 | 112 |
|---|---|---|---|---|---|---|---|---|---|
| 113 | 116 | 115 | 117 | 114 | 111 | 106 | 104 | 109 | 113 |
| 123 | 127 | 131 | 139 | 145 | 145 | 144 | 143 | 144 | 138 |
| 162 | 150 | 138 | 141 | 143 | 137 | 131 | 127 | 124 | 114 |
| 165 | 131 | 99 | 98 | 101 | 104 | 109 | 111 | 110 | 103 |
| 163 | 130 | 97 | 95 | 100 | 107 | 117 | 120 | 126 | 129 |
| 160 | 138 | 114 | 111 | 111 | 118 | 123 | 126 | 126 | 130 |
| 121 | 117 | 108 | 103 | 101 | 101 | 99 | 96 | 96 | 100 |
| 111 | 111 | 107 | 104 | 102 | 101 | 101 | 99 | 100 | 103 |
| 126 | 130 | 131 | 132 | 139 | 142 | 146 | 143 | 146 | 146 |

FIG. 6

| 130 | 134 | 128 | 124 | 115 | 112 | 108 | 105 | 108 | 113 |
|---|---|---|---|---|---|---|---|---|---|
| 114 | 117 | 116 | 118 | 115 | 112 | 108 | 106 | 110 | 114 |
| 124 | 127 | 131 | 138 | 143 | 143 | 142 | 142 | 143 | 137 |
| 159 | 148 | 137 | 140 | 141 | 136 | 131 | 127 | 124 | 115 |
| 162 | 130 | 101 | 100 | 103 | 105 | 111 | 112 | 112 | 105 |
| 160 | 129 | 99 | 98 | 102 | 109 | 118 | 121 | 126 | 129 |
| 157 | 137 | 115 | 112 | 112 | 119 | 123 | 126 | 126 | 129 |
| 121 | 118 | 109 | 104 | 103 | 103 | 101 | 99 | 98 | 102 |
| 112 | 112 | 108 | 105 | 104 | 103 | 103 | 101 | 102 | 105 |
| 126 | 129 | 131 | 131 | 138 | 140 | 144 | 142 | 144 | 145 |

3,961,134

BI-LEVEL DISPLAY SYSTEM

BACKGROUND OF THE INVENTION

1. Field of the Invention

The present invention relates generally to bi-level pumping oil and, more particularly, to such systems in which continuous tone images may be displayed by controlling the thresholds at which individual elements in the display are actuated.

2. Description of the Prior Art

Various techniques have heretofore been proposed to display grey-scale or continuous tone images on a bi-level display. These techniques are both interesting and useful, since such displays typically include a matrix of individual, closely spaced cells each of which resides in one of two visual states, either completely energized (ON) or completely de-energized (OFF), and since bi-level displays are particularly well suited for use in systems in which picture data is digitally encoded. Because the panel itself has no inherent capability for representing grey scale, it is the processing of the picture elements and/or the manner in which individual cells are energized that creates a subjective impression in the viewer of continuous tone gradations from very dark to very light. For example, in one prior art processing technique known as ordered dither, the cells of the display panel are divided into a plurality of submatrices of predetermined size such as 16 cells in a four-cell-by-four-cell arrangement. Each cell within each submatrix is assigned a spatially corresponding threshold value from a predetermined "dither matrix" having in this example 16 threshold values distributed between the upper and lower limits in which picture intensity is quantized; numerically successive threshold values are substantially equally spaced throughout the submatrix. In operation, the quantized intensity of each picture element is compared to the threshold thus set for the corresponding display cell. An intensity greater than the assigned threshold value resulting in cell energization, while an intensity less than the threshold maintains the cell in its de-energized condition. Further details of the ordered dither technique are contained in an article by Judice, Jarvis and Ninke entitled "Using Ordered Dither to Display Continuous Tone Pictures on an AC Plasma Panel," *Proceedings SID*, Fourth Quarter, 1974.

In another prior art technique, the cells of a bi-level display panel are grouped into regions, for example 2 × 2 cells wide. The picture intensity corresponding to a particular region is quantized, in this example into one of four possible levels, and the number of energized cells per region is determined by the quantized intensity. Details of this technique are contained in A. Sobel, U.S. Pat. No. 3,647,958 and L. J. Schmersal et al, U.S. Pat. No. 3,845,243.

While both of the aforedescribed techniques, as well as others known in the art, produce satisfactory results for certain types of pictures, the subjective appearance differs from system-to-system and may be better for photographs of people than for graphics, line drawings and text. In addition, certain techniques may not be capable of producing the wide range of tonality needed for a pleasing continuous tone display. Accordingly, it is the broad object of the present invention to provide subjectively pleasing continuous tone images on a bi-level display device, particularly with respect to graphics, line drawings and text. A further object is to achieve a wide range of tonality in the processed picture.

SUMMARY OF THE INVENTION

The foregoing and additional objects are achieved in accordance with the principles of the present invention by a bi-level display system in which thresholds $\phi_T$ are established for each display cell by determining the average intensity $\bar{\phi}$ of picture elements in the neighborhood of a particular cell, and of $\phi_T$ by constraining the average to a narrower range according to a single value function such as $$\phi_T = \gamma + \left(1 - \frac{2\gamma}{\phi_{max}}\right)\bar{\phi},$$

where $\phi_{max}$ is the maximum intensity possible for a given picture element and $\gamma$ is a constant which can be determined subjectively or which can be related to the noise in the picture area. A given cell is actuated only when its intensity bears a predetermined relationship (e.g., — exceeds) the threshold so established.

The constrained average technique in accordance with the invention advantageously provides a good grey scale rendition of the processed picture, and additionally provides edge emphasis which creates enhanced legibility of text, line drawings and other high detail material.

BRIEF DESCRIPTION OF THE DRAWING

The invention will be more clearly understood from a consideration of the following detailed description when read in light of the accompanying drawing in which:

FIG. 2 is a hand-drawn and stippled version of a continuous tone drawing which may be displayed using the technique of the instant invention;

FIG. 3 is a map of quantized picture element intensity values of a small portion of the drawing of FIG. 2;

FIG. 4a is a diagram of a 10 × 10 matrix of picture elements;

FIG. 5 is a map of the neighborhood averages of picture element intensities shown in FIG. 3;

FIG. 6 is a map of the constrained averages computed in accordance with the invention from the neighborhood averages of FIG. 5;

DETAILED DESCRIPTION

Figure 1:
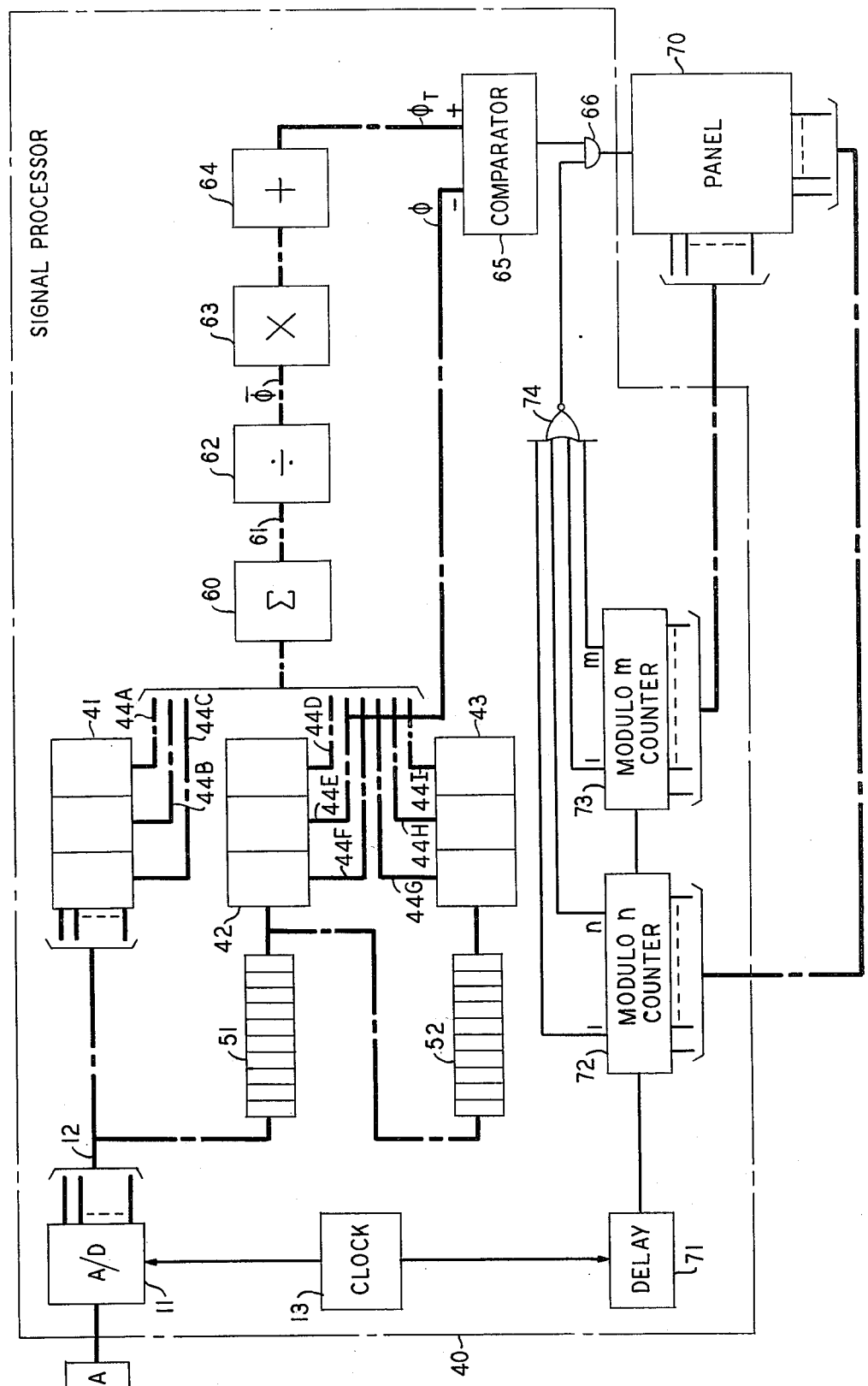
FIG. 1 is a block diagram of a bi-level display system utilizing the constrained average technique for presenting grey-scale or continuous-tone images, in accordance with the instant invention.

The bi-level display system shown in FIG. 1 includes a source of input picture data which may include a camera 10, a signal processor 40 and a bi-level display panel 70. Panel 70 may, for example, be a plasma display panel such as that disclosed in D. T. Ngo U.S. Pat. No. 3,671,938 issued June 20, 1972. Alternatively, the present invention can be practiced in conjunction with other types of bi-level displays, including a cathode-ray tube operated in a bi-level mode, liquid crystal displays in which light reflection or transmission is switched between two discrete states, and modern scoreboards which comprise a large matrix or array of individually energizable light bulbs. Thus, in general, panel 70 can be conceptualized as a matrix of $m \times n$ cells arranged in $m$ rows and $n$ columns, each cell, whether an individual discrete device or a particular area of a continuous display medium such as the phosphor surface of a cathode-ray tube, being capable of residing in one of two visual states — either fully energized (ON), or fully de-energized (OFF).

Images to be displayed on panel 70 may be real scenes originating from camera 10 or from a film scanner (not shown), or mechanically like device, or may be pictures, drawings, text etc., composed by a computer or otherwise available as a series of electrical signals. When camera 10 or other apparatus having an analog output is used, its output is advantageously applied to an analog-to-digital converter 11 of conventional design, which quantizes the analog signal and provides a multibit output binary signal on cable 12. Illustratively, a word length of 8 bits correspond to 256 intensity levels between 0 and 255. The image to be displayed is scanned by camera 10 under the control of a clock generator 13, beginning with the top row and proceeding from left to right in each row. The output of converter 11 is thus a series of multibit words each representative of the intensity $\phi$ of the picture elements of the image. In the event that the image is computer composed, converter 11 is, of course, not required, as long as the computer is arranged to generate an output in the correct format.

An exemplary hand-drawn and stippled version of a continuous tone drawing which may be displayed on panel 70 is shown in FIG. 2. A map of picture element intensity values of a small portion 15 of FIG. 2 is shown in FIG. 3. Values toward $\phi_{max} = 255$ indicate high intensity (white), while values toward $\phi_{min} = 0$ indicate a low intensity (black) picture elements. As stated previously, intensity values of picture elements are advantageously processed as digital (binary) signals. However, for convenience of description, the intensity values shown in FIGS. 3, 5 and 6 are represented in the equivalent base 10 notation, e.g., an intensity of $21_{10} = 00010101_2$, an intensity of $203_{10} = 11001011_2$.

Referring again to FIG. 1, the output of converter 11 on cable 12 is applied to the input of a three stage shift register 41, and to the input of an $n$ stage shift register 51, where $n$ is the number of picture elements per row of the scanned image. The last stage of register 51 is connected to the input of a second three stage shift register 42, as well as to the input of a second $n$ stage register 52. The last stage of register 52 is connected to the input of a third three stage shift register 43. Since each stage of each register is arranged to store a multibit binary word representative of the intensity of a particular picture element, the lines interconnecting the registers are cables arranged to transmit such multibit words. Data flow through the registers is controlled by timing inputs (not shown) to each register from clock 13.

To better understand the sequence of data flow through registers 41–43, 51 and 52, FIG. 4a depicts a 10 × 10 matrix of picture elements wherein the first row includes elements $A_1$ through $A_{10}$, the second row includes elements $B_1$ through $B_{10}$, and so on, the last or bottom row including elements $J_1$ through $J_{10}$. As stated previously, camera 10 scans these elements from left to right in each row, starting with the top row, so that the data stream on cable 12 represents the intensity values of the image elements in the following order: $A_1, A_2, A_3 \ldots A_{10}, B_1, B_2, B_3 \ldots B_{10}, C_1, C_2 \ldots C_{10}, D_1 \ldots D_{10}, E_1 \ldots E_{10}, \ldots J_1, J_2 \ldots J_{10}$.

Figure 4B:
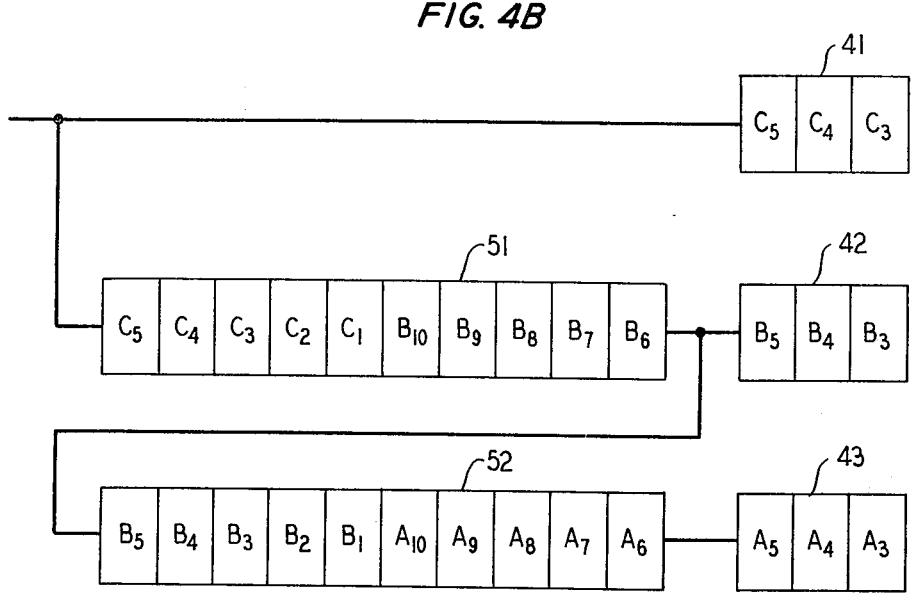
FIG. 4b is a block diagram of the contents of the registers of FIG. 1 at one point in the processing cycle.
Figure 4C:
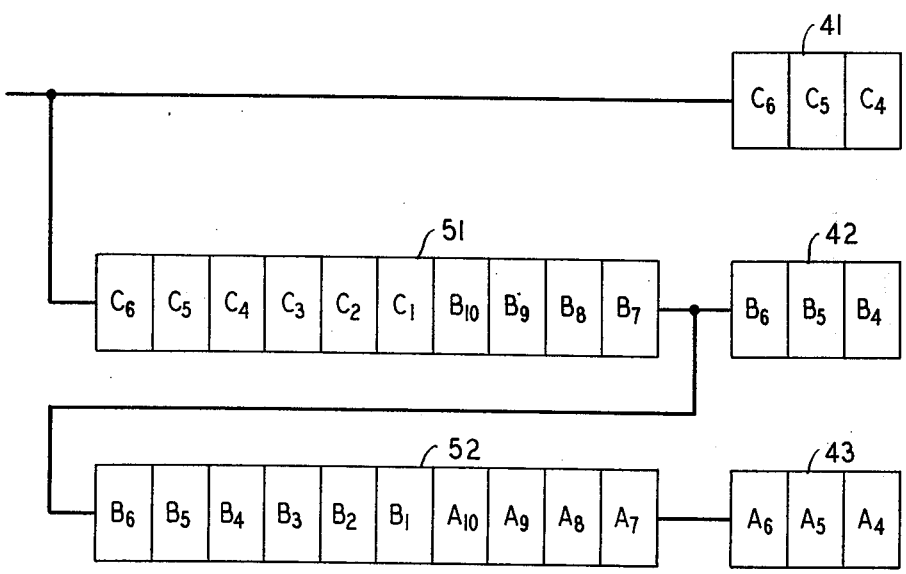
FIG. 4c is similar to FIG. 4b, but shows a different point in the processing cycle.

As the data stream is applied to the registers, data enters on the left and shifts one position to the right at each occurrence of a timing pulse from clock 13. Thus, after one timing pulse, the intensity word corresponding to picture element $A_1$ is stored in first stage of registers 41 and 51, and the remaining stages are empty. After the second timing pulse, word $A_1$ is in the second stages of registers 41 and 51, and word $A_2$ is stored in the first stages thereof. After 25 timing pulses the contents of the registers are shown in FIG. 4b, and the contents after the next (26th) pulse are shown in FIG. 4c. In this example, $n = 10$, so that registers 51 and 52 each include 10 stages.

As shown in FIG. 4b, the contents of registers 41–43 represent the picture element intensity values in the "neighborhood" of picture element $B_4$, where "neighborhood" is defined to include a given picture element and the 8 other picture elements immediately surrounding and contiguous to that element. Similarly, as shown in FIG. 4c, the contents of registers 41–43 represent the picture element intensity values in the neighborhood of picture element $B_5$, namely $C_4$–$C_6$, $A_4$–$A_6$, $B_4$ and $B_6$. From the foregoing description, it will be clear that as picture element intensity data is shifted through registers 51, 52 and 41–43, the contents of the latter 3 registers represent a nine word neighborhood centered around the picture element the intensity of which is stored in the middle stage of register 42.

Each of the intensity words stored in the stages of registers 41–43 are applied to the input of a summation circuit 60 once during each timing interval, via cables 44A–44I. Circuit 60 may include a digital to analog converter for each input thereto, in which case summation is performed using analog techniques. Alternatively, circuit 50 may comprise digital adders, and provide a multibit digital output on cable 61, as shown in FIG. 1.

The output of circuit 60 is applied to a divider circuit 62, which is arranged, in accordance with the invention, to provide an output which is 1/9 of the input value. The outputs of divider 62, generated once each time period under the control of a timing input from clock 13, thus represent the average intensity $\bar{\phi}$ of each picture element and the picture elements in its neighborhood. For example, referring to FIG. 3, the elements in the neighborhood of the picture element of intensity 30 in row 2, column 2 are 171, 156, 156, 42, 39, 144, 153 and 159. The sum of these intensities is 1050, so that the neighborhood average intensity of the element in row 2, column 2, rounded to the next lowest integer, is 116. This value is found in row 2, column 2, of FIG. 5, which maps, for the purposes of illustration, the neighborhood averages provided from the output of divider 62 based on the picture element intensity values of FIG. 3. It is to be noted that averages for those elements on the perimeter of FIGS. 3 and 5 are in part based on other intensity values that are not shown. In addition, intensity values for elements on the perimeter of the entire picture to be processed constitute a special case, since the outputs of registers 41–43 are not truly representative of the neighborhoods of such elements. For this reason, as will be explained more fully hereinafter, a one cell wide border around the perimeter of the image being displayed may be blanked, or otherwise discarded, and only the internal picture elements actually utilized. This procedure involves only an insignificant loss of picture information, since a typical displayed image may include 512 rows and columns of picture elements, in which case 2044 elements (<1%) are discarded and 261,121 are retained.

Returning again to FIG. 1, the neighborhood averages $\bar{\phi}$ generated by divider 62 are applied to a multiplier circuit 63 and then to an adder circuit 64, which circuits together function to "constrain" the previously computed neighborhood averages in accordance with one particular constraining function that has been found to be easy to implement and to yield satisfactory results. Specifically, multiplier 63 is arranged to provide an output which is $(1 - 2\gamma/\phi_{max})$ times the input $\bar{\phi}$ applied thereto, where $\gamma$ is a constant to be discussed in more detail hereinafter, and $\phi_{max}$ is the maximum possible intensity value. Adder 64 is arranged to add the quantity $\gamma$ to the input thereto, so that its output, $\phi_T$ is given by $$\phi_T = \gamma + \left(1 - \frac{2\gamma}{\phi_{max}}\right) \bar{\phi}. \qquad (1)$$

For example, for $\phi_{max} = 256$ and $\gamma = 15$, the constrained average $\phi_T$ for the picture element in row 2, column 2 (which element has a neighborhood average $\bar{\phi} = 116$) is $\phi_T = 15 + (1 - 30/256)\bar{\phi} = 15 + (0.883)(116) = 117$. The constrained averages calculated for the neighborhood averages of FIG. 5 are mapped, with relative positions maintaining the same, in FIG. 6.

The constrained average intensities generated by adder 64 are applied to one input of a comparator 65, the other input to which is obtained from the middle stage of register 42, which contains the intensity value of the picture element then being processed. Comparator 65 is arranged to produce a high output only when the register intensity value equals or exceeds the constrained average. The output of comparator 65 is applied via AND gate 66 to the bi-level display panel 70 being used to display the desired image.

Addressing of the individual cells of panel 70 is accomplished as follows: timing signals from clock 13 are applied via a delay circuit 71 to the input of a modulo $n$ counter 72, which in turn is connected to a modulo $m$ counter 73. Delay circuit 71 is arranged to delay timing pulses applied thereto by $n + 2$ bits, so that counter 72 begins counting only when the intensity value corresponding to the picture element in row 1, column 1 has entered the middle stage of register 42. Thereafter, timing pulses advance counter 72 in synchronism with the advance of data through registers 41–43 and 51, 52, so that the counter 72 output corresponds to the column location of the picture element being processed. After $n$ pulses have been counted, counter 72 resets to 1, and simultaneously, counter 73, initially set to a count of 1, advances to a count of 2. The output of counter 73 thus corresponds to the row in which data is being processed. The outputs of counters 72 and 73 are applied to the horizontal and vertical control inputs of panel 70, respectively, so that the output of AND gate 66 is applied to the display element in panel 70 which corresponds to the picture element being processed.

As mentioned previously, inaccuracies in the computation of neighborhood averages for the picture elements around the perimeter of the image being processed make it desirable to blank or discard these picture elements. For this purpose, the first and last count outputs of counters 72 and 73, which correspond to picture elements in the first and last columns and rows, respectively, are connected to a NOR gate 74, the output of which is connected to the input of AND gate 66. This assures that the perimeter elements of panel 70 will remain de-energized. As mentioned previously, an insignificant amount of picture information is lost by so doing.

Figure 7:
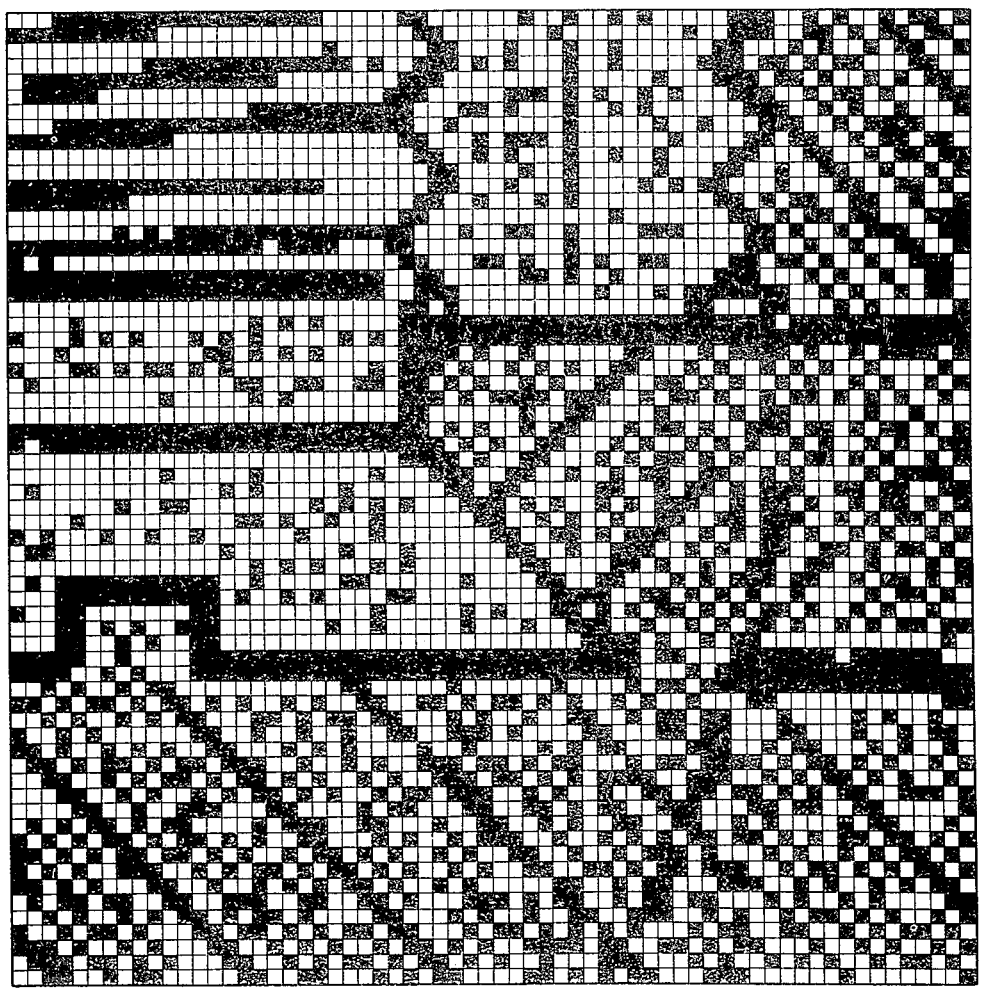
FIG. 7 is an enlarged view of a bi-level display panel using the constrained averages of FIG. 6 as thresholds for the display of a portion of the drawing of FIG. 2.

FIG. 7 depicts a bi-level display panel such as panel 70 displaying a portion 16 of the drawing of FIG. 2 using the constrained average technique of the present invention. The light areas correspond to display cells which are energized or ON, and the dark areas correspond to display cells which are OFF. When the viewer observes the FIG. 7 representation of panel 70 from a distance, it will be seen that various shades of grey appear in the reproduced image.

The processing technique of the present invention involves two essentially separate functions. First, to preserve the tonality (grey scale) of the original image, the number of lit cells in an area is proportionally related to the average image brightness in the area. Second, since the display resolution is limited, edge emphasis is used to increase the legibility of line, textual and other high detail areas of the displayed image. To understand the derivation of equation (1), which produces both desired results, consider a picture area, A of constant brightness. After processing by camera 10, the intensities representing A are characterized by a normalized distribution function, $f(\phi)$, where $$\int_{-\infty}^{+\infty} f(\phi)d\phi = 1 \qquad (2)$$

and $$\bar{\phi} = \int_{-\infty}^{\infty} \phi f(\phi)d\phi. \qquad (3)$$

Since the quantity $\bar{\phi}$ is the average intensity of the representation of the constant brightness area A, rendition of A at the brightness indicated by $\bar{\phi}$ requires that a fraction of the display cells $\bar{\phi}/\phi_{max}$ must be lit. The cumulative probability function can be written as $$p(\phi \geq x) = \int_{x}^{\infty} f(\phi')d\phi' \qquad (4)$$

which is the probability that a given $\phi$ is greater than $x$. The required threshold, $\phi_T$ is then obtained from $$\int_{\phi_T}^{\infty} f(\phi)d\phi = \overline{\phi}/\phi_{max} \qquad (5)$$

since $\overline{\phi}/\phi_{max}$ of the cells must have a value greater than $\phi_T$. Equation (5) may be solved for $\phi_T$ by first considering a set of intensities $\phi$ representing an area of constant brightness characterized by a rectangular noise distribution:

$$f(\phi) = \tfrac{1}{2}\gamma \text{ if } \overline{\phi}-\gamma \leq \phi \leq \overline{\phi}+\gamma$$

$$f(\phi) = 0 \quad \text{otherwise.} \qquad (6)$$

With the appropriate substitution and changes of integration limits, equation (5) becomes:

$$\frac{1}{2\gamma} \int_{\phi_T}^{\overline{\phi}+\gamma} d\phi = \overline{\phi}/\phi_{max} \qquad (7)$$

which yields $$\phi_T = \gamma + \overline{\phi}\left(1 - \frac{2\gamma}{\phi_{max}}\right). \qquad (8)$$

Figure 8:
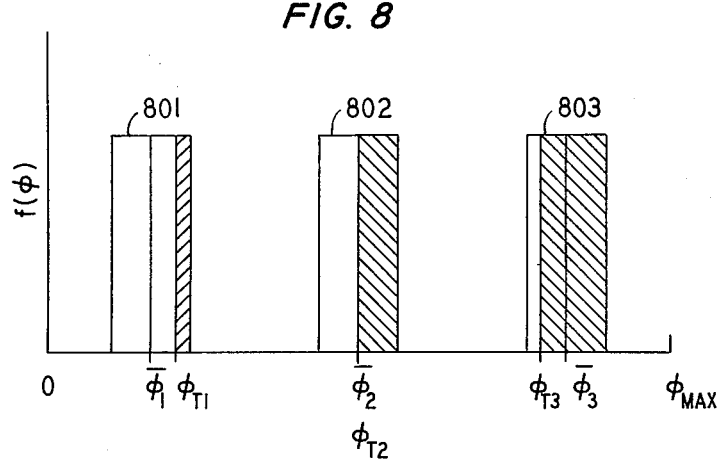
FIG. 8 is a graph showing rectangular distribution functions for three areas of different intensities, and thresholds calculated for these areas in accordance with the instant invention.

This, of course, is the same as equation (1) which is implemented in the apparatus of FIG. 1. The result expressed by equation (8) is illustrated in FIG. 8, which shows a rectangular distribution function for three areas 801, 802, 803 of different intensities, $\overline{\phi}_1$, $\overline{\phi}_2$ and $\overline{\phi}_3$, respectively. The $\phi_T$ for each area is shown ($\phi_{T1}$, $\phi_{T2}$, $\phi_{T3}$); the fraction of display cells that would be lit is indicated by the cross hatched area in each distribution. For $\overline{\phi}_2 = \phi\text{max}/2$, $\phi_{T2}$ is in the middle of the distribution, indicating that half the cells would be lit, as expected. For $\overline{\phi}_1$ and $\overline{\phi}_3$, the corresponding thresholds are such that less than half and more than half of the cells are lit, respectively.

A second distribution of importance is the Gaussian distribution, since it models many of the noise properties seen in real signals. Again, assuming an area of constant brightness, the Gaussian probability distribution can be written:

$$p(\phi) = \frac{1}{\sigma\sqrt{2\pi}} e^{-(\phi - \overline{\phi})^2/2\sigma^2} \qquad (9)$$

where $\sigma$ is the standard deviation of the signal and $\phi$ is the average intensity in the area. The threshold $\phi_T$ can be determined from the distribution function by the appropriate substitution into equation (5):

$$\frac{1}{\sigma\sqrt{2\pi}} \int_{\phi_T}^{\infty} e^{-(\phi - \overline{\phi})^2/2\sigma^2} d\phi = \overline{\phi}/\phi_{max}. \qquad (10)$$

The solution to this equation is well known and allows specification of $\phi_T$ in terms of the error function erf., as follows:

$$\overline{\phi}/\phi_{max} = \tfrac{1}{2}\left(1\text{-erf}\left(\frac{\phi_T - \overline{\phi}}{\sqrt{2}\,\sigma}\right)\right) \qquad (11)$$

which yields:

$$\phi_T = \overline{\phi} + \sigma\sqrt{2}\,\text{erf}^{-1}(1 - 2\overline{\phi}/\phi_{max}). \qquad (12)$$

From the series expansion for erf with small arguments, the following approximation, valid for $\overline{\phi} \approx \phi_{max}/2$, is obtained.

$$\phi_T = \frac{\sigma\sqrt{2\pi}}{2} + \overline{\phi}\left(1 - \frac{\sigma\sqrt{\pi}}{\phi_{max}}\right). \qquad (13)$$

This approximation has the same functional relationship in form as equation (9) which was arrived at for a rectangular noise distribution, since it is seen that if $\gamma = \sigma\sqrt{2\pi}/2$, then equations (8) and (13) are identical. The similarities between equations (8) and (13) can also be seen in FIG. 9, which is a graph of threshold values $\phi_T$ plotted against the average intensity $\overline{\phi}$ for the rectangular and Gaussian noise models. For the rectangular distribution, and using equation (8), line 901 shows that $\phi_T$ is constrained to the range between $\gamma$ and $\phi_{max} - \gamma$ as $\overline{\phi}$ varies from 0 to $\phi_{max}$, respectively. The Gaussian noise curve 902 tracks curve 901 in the middle range of $\overline{\phi}$, and deviates only at very low and very high values of average intensity.

Figure 9:
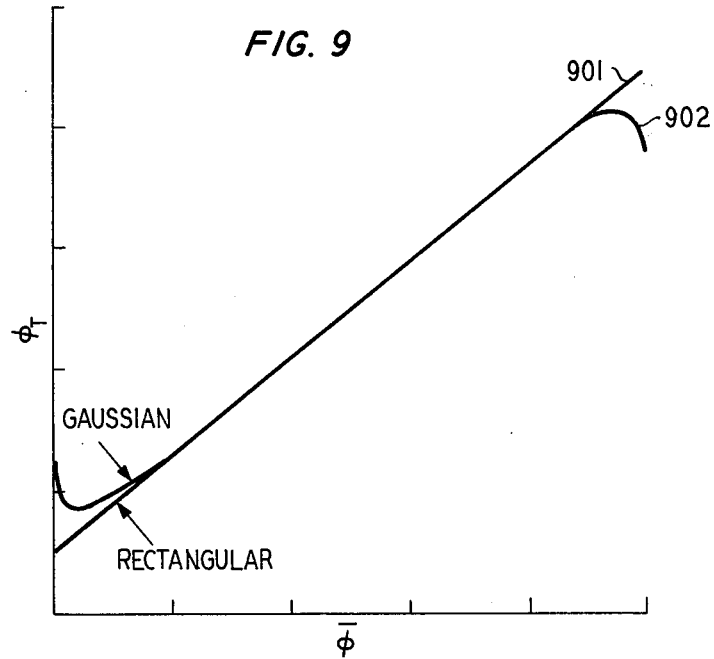
FIG. 9 is a graph showing the relationship between the neighborhood averages $\bar{\phi}$ and the constrained averages calculated in accordance with the invention.

The curves of FIG. 9 show that the constraint value, $\gamma$, required to generate a full range of tonality (grey scale) in the processed picture can be related to the noise characteristics of the picture data ($\sigma$). Where constraining is not used (i.e., $\gamma=0$) grey-scale is not produced. Alternatively, $\gamma$ can also be thought of as an arbitrary parameter that can be specified to obtain a pleasing rendition of the original subject. Variations in $\gamma$ in the range between $\phi_{max}/100$ and $\phi_{max}/10$ varies the contrast in the displayed image. Qualitatively, $\gamma > 0$ results in normal grey-scale rendition, $\gamma = 0$ produces no grey-scale but gives edge emphasis only, as will be explained in more detail hereinafter, and $\gamma < 0$ results in a negative-like image display, but not a true negative image, since the edge enhancement still turns on cells that are more positive than their neighborhood average. A value of $\gamma = \phi_{max}/2$ results in $\phi_T = \phi_{max}/2$, which is a fixed threshold that produces neither grey-scale nor edge emphasis.

Although FIG. 9 shows only two curves by which average intensities $\overline{\phi}$ may be "constrained" to produce corresponding thresholds $\phi_T$, it is to be clearly understood that in the most general case, any single valued curve $\phi_T = f(\overline{\phi})$ including curves other than straight lines, may be used to map $\overline{\phi}$ into $\phi_T$. However, implementation using a linear function is generally simpler, and yet provides sufficient flexibility in adjusting the displayed image. For example, if the $\gamma$ axis intercept of line 901 is shifted upwardly, without changing the slope thereof, the overall brightness of the displayed image is decreased, since $\phi_T$ values are higher than previously. Conversely, if line 901 is shifted downwardly, the overall brightness increases. If the $\gamma$ intercept remains the same, but the slope of line 901 is increased toward 1, the apparent contrast of the displayed image is decreased, since the range to which $\phi_T$ values are constrained is increased. Slopes greater than 1 produce the negative-like image previously mentioned. If the slope is reduced toward 0, apparent contrast is increased, since with a zero slope, a constant threshold is maintained.

Although equation (8) was derived solely on the basis of grey-scale representation in the processed picture, it also serves as a means for understanding the edge enhancement properties of the processing technique of the present invention. Edge emphasis is obtained in a region of a step change in intensity, since in that region the computation of $\phi_T$ is "different" from what it would be for strict grey-scale representation. Specifically, on the bright side of the step, $\phi_T$ will be lower than that needed for grey-scale representation, since the neighborhood average will include cells of lower intensity. Consequently, individual cells on the bright side will have a higher probability of being ON than would have existed in the absence of the step change. Conversely, on the darker side of the step, $\phi_T$ will be higher than otherwise needed for grey-scale rendition, due to the influence of neighborhood elements of high intensity. As a result, cells in this area would have a lower probability of being turned ON than would ordinarily be the case.

While images resulting from processing with the constrained average technique of the present invention achieve desired grey-scale representation (as long as $\gamma \neq 0$) and advantageously show edge emphasis as described above, the images have a noticeable granular or noisy appearance. This occurs since the technique provides no control over the spatial frequencies in the patterns generated. Where it is desired to minimize the low spatial frequency error components in the displayed image, it has been found that combination of the constrained average technique with the ordered dither technique described in the copending application of C. N. Judice, entitled Bi-Level Display Systems, Ser. No. 560,505 filed Mar. 19, 1975, and assigned to the same assignee as the present invention, gives results that include the best features of both techniques. Combination is effected by constructing an NxN dither matrix that contains all values between 0 and $N^2-1$ exactly once, as for example, the 4×4 matrix:

|  |  |  |  |
|---|---|---|---|
| 0 | 8 | 2 | 10 |
| 12 | 4 | 14 | 6 |
| 3 | 11 | 1 | 9 |
| 15 | 7 | 13 | 5 | and by shifting the matrix values so that the dither values are signed quantities with the sum of all elements in the matrix equal to zero, as follows:

|  |  |  |  |
|---|---|---|---|
| −7½ | ½ | −5½ | 2½ |
| 4½ | −3½ | 6½ | −1½ |
| −4½ | 3½ | −6½ | 1½ |
| 7½ | −½ | 5½ | −2½ |

Figure 10:
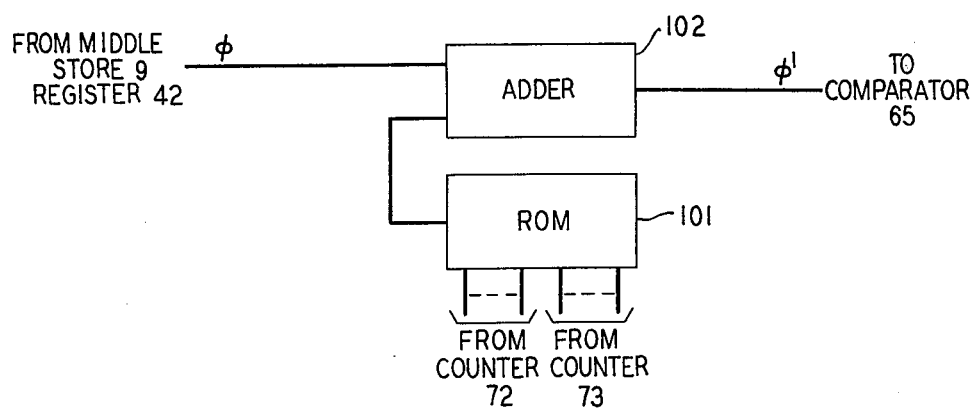
FIG. 10 is a schematic diagram of a circuit used to incorporate a dither matrix into the circuitry of FIG. 1.

The latter matrix, or a multiple thereof, may be stored in a 16-word read-only memory 101 of FIG. 10. Depending upon address information received from counters 72 and 73, memory 101 is arranged to supply an appropriate word stored therein to one input terminal of adder 102, the other input of which is the intensity $\phi$ of the picture element then being processed in the middle stage of register 42. Adder 102 simply algebraically adds the stored dither value to the intensity value to derive a modified intensity value $\phi'$ which is supplied to comparator 65 for processing as heretofore described.

Since the dither signal added to the intensity information is position dependent, the resulting displayed image is more regular than the strictly random patterns generated using the constrained average technique alone. It is to be noted that when the amplitude of the added dither signal is greater than the inherent noise in the picture signal, the parameter $\gamma$ may be set as a function of the dither amplitude only; since such amplitude is predetermined, a fixed $\gamma$ can thus be used.

Figure 11:
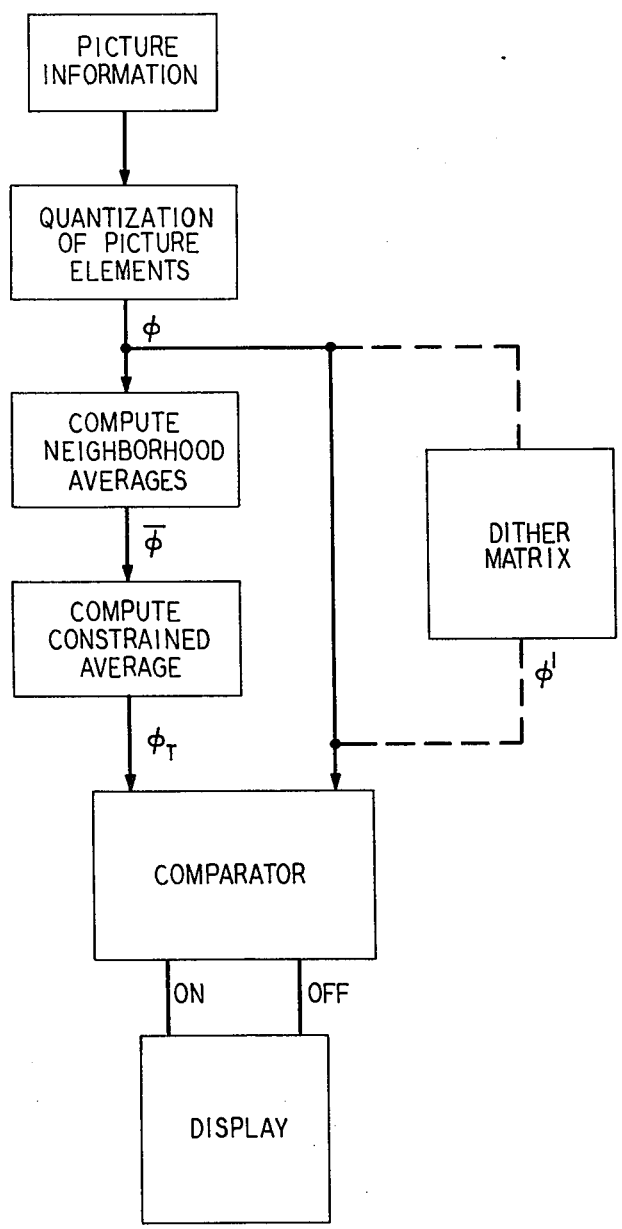
FIG. 11 is a flow diagram showing the steps followed by the apparatus of FIG. 1 in making a constrained average calculation.

A summary of the processing sequence used in the constrained average technique is depicted in the flow diagram of FIG. 11. As shown therein, picture information is divided into picture elements each having a quantized intensity value $\phi$. The picture elements are then combined to generate neighborhood averages $\bar{\phi}$ for each element. Next, the neighborhood averages are constrained, using equation (1), to achieve a threshold value $\phi_T$, and the threshold is compared with the picture element intensity value to determine if the display cell corresponding to the picture element being processed is to be ON or OFF. If it is desired to combine dither with the processing previously described, the picture element intensity values $\phi$ are modified in the dither step, shown dotted in FIG. 11, and the modified values $\phi'$ are used in the comparison step.

Various modifications and adaptations of the invention will be readily apparent to those skilled in the art. For this reason, it is intended that the invention be limited only by the appended claims. For example, in the apparatus of FIG. 1, divider 62 and multiplier 63 can be combined into a single multiplier having the appropriate multiplication coefficient. In addition, summer 60 can be replaced by a number of simple adders connected appropriately to registers 41–43, 51 and 52. Still further, it is to be understood that while the apparatus of FIG. 1 is set up for digital processing, analog equivalents for the various system components are readily available and may instead be used. Also, while neighborhood averages are computed using a given picture element and its eight nearest neighbors, it is to be understood that other neighborhoods can be used, and that neighborhood averages can be computed using various filtering techniques in lieu of a straight arithmetic average.

What is claimed is:

1. A system for displaying a continuous tone image on a panel of selectively energizable display cells, comprising
   means for dividing an image to be displayed into a plurality of picture elements each corresponding to one of said display cells,
   means for determining the intensity of $\phi$ of each of said picture elements, the maximum intensity of any picture element being designated $\phi_{max}$
   means for computing the average intensity $\bar{\phi}$ in the neighborhood of each of said picture elements,
   means for computing constrained averages $\phi_T$ from said neighborhood averages in accordance with the relationship $$\phi_T = \gamma + \left(1 - \frac{2\gamma}{\phi_{max}}\right)\bar{\phi}$$

wherein $\gamma$ is a constant, and means for energizing a particular one of said display cells corresponding to a particular one of said picture elements if said intensity $\phi$ of said picture element bears a predetermined relationship to said constrained average $\phi_T$ computed for said picture element neighborhood.

2. The invention defined in claim 1 wherein said neighborhood average computing means includes means for averaging said intensity of a particular picture element and the eight picture elements immediately surrounding said particular picture element.

3. The invention defined in claim 2 wherein $\gamma$ is selected in the range between $\phi_{max}/100$ and $\phi_{max}/10$.

4. The invention defined in claim 2 wherein $\sigma$ represents the standard deviation of picture element intensities of said image, and $$\gamma = \frac{\sigma \sqrt{2\pi}}{2}.$$

5. The invention defined in claim 1 further including means for modifying said picture element intensity values $\phi$ in accordance with a position dependent dither matrix, to achieve a modified intensity $\phi'$, and wherein said energizing means includes means for comparing said modified intensity $\phi'$ to said constrained average intensity $\phi_T$.

6. A display system including
a panel of bi-level display cells and
means for selectively energizing said cells of said panel to display a continuous tone image having a plurality of picture elements, each of said elements having intensities in a first range between 0 and $\phi_{max}$,
said energizing means including
first means for computing the average intensity $\bar{\phi}$ in a neighborhood of each of said picture elements,
second means responsive to said first means for mapping said average intensities into a second range different from said first range, each of said mapped intensities being a threshold $\phi_T$ for the corresponding one of said picture elements, and
third means responsive to said second means for comparing said intensities of each of said picture elements with said threshold $\phi_T$ corresponding to said picture element and for energizing an appropriate one of said display cells if said intensity bears a predetermined relationship to said threshold.

7. The invention defined in claim 6 wherein said second means is arranged to map said average intensities $\bar{\phi}$ into thresholds $\phi_T$ according to the relationship $$\phi_T = \gamma + \left(1 - \frac{2\gamma}{\phi_{max}}\right) \bar{\phi}$$

wherein $\gamma$ is a constant.

8. The invention defined in claim 7 wherein said picture element intensities have a standard deviation $\sigma$, and $$\gamma = \frac{\sigma \sqrt{2\pi}}{2}.$$

9. The invention defined in claim 7 wherein $\gamma$ is selected in the range between $\phi_{max}/100$ and $\phi_{max}/10$.

10. The invention defined in claim 7 wherein said first means is arranged (a) to compute a sum of the intensities of each of said picture elements and its eight nearest neighboring picture elements, and (b) to divide said sum by 9.

11. Apparatus for displaying an image on a bilevel display device having a plurality of display elements each capable of residing in one of two visual states, comprising
quantizing means for assigning to each element of said image an intensity value in the range between 0 and $\phi_{max}$,
means for determining a threshold $\phi_T$ corresponding to each of said picture elements, including first means for computing the average intensity $\bar{\phi}$ in the vicinity of each of said picture elements, and second means for mapping said average intensities into a range narrower than between 0 and $\phi_{max}$, and
means for selectively actuating particular ones of said display elements if said intensity value $\phi$ of said picture element bears a predetermined relationship to said threshold $\phi_T$ corresponding to said picture element.

12. The invention defined in claim 11 wherein said second means is arranged to linearly map said picture element intensity values into the range between $\gamma$ and $\phi_{max} - \gamma$, wherein $\gamma$ is a positive constant.

13. The invention defined in claim 11 wherein said second means is arranged to map said average picture element intensities $\bar{\phi}$ according to the relationship $$\phi_T = \gamma + \left(1 - \frac{2\gamma}{\phi_{max}}\right) \bar{\phi}$$

wherein $\gamma$ is a constant.

14. The invention defined in claim 13 wherein $\gamma$ is selected in the range between $\phi_{max}/100$ and $\phi_{max}/10$.

15. The invention defined in claim 13 wherein $\gamma = \sigma \sqrt{2\pi}/2$ and $\sigma$ equals the standard deviation of said picture element intensity values.

16. The invention defined in claim 11 wherein said quantizing means further includes means for modifying said assigned intensity values in accordance with a pattern dependent upon the position of said picture element in said image.

17. Apparatus for displaying an image having a plurality of areas of various intensities on a display device having a plurality of display cells each capable of residing in one of two visual states, including
means for associating a particular one of said display cells with a particular one of said areas,
means for determining the average intensity $\bar{\phi}$ of said particular one of said areas and the areas surrounding said particular area, said average intensity falling within a first range,
means for constraining said average intensity to a range narrower than said first range, thereby producing a threshold value $\phi_T$, and
means for actuating said particular one of said display cells if said intensity of said particular one of said areas bears a predetermined relationship to said threshold.

18. The invention defined in claim 17 wherein said constraining means constrains said average intensity $\bar{\phi}$ according to the relationship $$\phi_T = \gamma + \left(1 - \frac{2\gamma}{\phi_{max}}\right) \bar{\phi}$$

wherein $\gamma$ is a constant and $\phi_{max}$ is the maximum value of said picture element intensity.

19. The invention defined in claim 18 wherein said average determining means includes a summing circuit and a dividing circuit.

20. The invention defined in claim 18 wherein said actuating means includes a comparator.

21. The invention defined in claim 18 wherein $\gamma$ is proportional to the standard deviation of said picture element intensities.

22. A method of displaying a continuous tone image on a panel of selectively energizable display cells, comprising the steps of
dividing an image to be displayed into a plurality of picture elements each corresponding to one of said display cells,
determining the intensity $\phi$ of each of said picture elements, the maximum intensity of any picture element being designated $\phi_{max}$
computing the average intensity $\bar{\phi}$ in the neighborhood of each of said picture elements,
computing constrained averages $\phi_T$ from said neighborhood averages in accordance with the relationship $$\phi_T = \gamma + \left(1 - \frac{2\gamma}{\phi_{max}}\right) \bar{\phi}$$

wherein $\gamma$ is a constant, and
energizing a particular one of said display cells corresponding to a particular one of said picture elements if said intensity $\phi$ of said picture element bears a predetermined relationship to said constrained average $\phi_T$ computed for said picture element neighborhood.

23. The invention defined in claim 22 wherein said neighborhood average computing step includes the step of averaging said intensity of a particular picture element and the eight picture elements immediately surrounding said particular picture element.

24. The invention defined in claim 23 wherein $\gamma$ is selected in the range between $\phi_{max}/100$ and $\phi_{max}/10$.

25. The invention defined in claim 23 wherein $\sigma$ represents the standard deviation of picture element intensities of said image, and $$\gamma = \frac{\sigma \sqrt{2\pi}}{2}.$$

26. The invention defined in claim 22 further including the step of modifying said picture element intensity values $\phi$ in accordance with a position dependent dither matrix, to achieve a modified intensity $\phi'$ and wherein said energizing step includes the step of comparing said modified intensity $\phi'$ to said constrained average intensity $\phi_T$.

27. A method of selectively energizing the cells of a panel of bi-level display cells to display a continuous tone image having a plurality of picture elements, each of said elements having intensities in a first range between 0 and $\phi_{max}$, comprising the steps of
computing the average intensity $\bar{\phi}$ in a neighborhood of each of said picture elements,
mapping said average intensities into a second range different from said first range, each of said mapped intensities being a threshold $\phi_T$ for the corresponding one of said picture elements,
comparing said intensities of each of said picture elements with said threshold $\phi_T$ corresponding to said picture element, and
energizing an appropriate one of said display cells if said intensity bears a predetermined relationship to said threshold.

28. The invention defined in claim 27 wherein said mapping of said average intensities $\bar{\phi}$ into said thresholds $\phi_T$ is accomplished according to the relationship $$\phi_T = \gamma + \left(1 - \frac{2\gamma}{\phi_{max}}\right) \bar{\phi}$$

wherein $\gamma$ is a constant.

29. The invention defined in claim 28 wherein $\gamma$ is selected in the range between $\phi_{max}/100$ and $\phi_{max}/10$.

30. The invention defined in claim 28 wherein said computing step includes the steps of (a) computing a sum of intensities of each of said picture elements and its eight nearest neighboring picture elements, and (b) dividing said sum by 9.

31. A method of displaying an image on a bi-level display device having a plurality of display elements each capable of residing in one of two visual states, comprising the steps of
assigning to each element of said image an intensity value in the range between 0 and $\phi_{max}$,
determining a threshold $\phi_T$ corresponding to each of said picture elements, including the steps of computing the average intensity $\bar{\phi}$ in the vicinity of each of said picture elements, and mapping said average intensities into a range narrower than between 0 and $\phi_{max}$, and
selectively actuating particular ones of said display elements if said intensity value $\phi$ of said picture element bears a predetermined relationship to said threshold $\phi_T$ corresponding to said picture element.

32. The invention defined in claim 31 wherein said mapping step includes linearly mapping said picture element intensity values into the range between $\gamma$ and $\phi_{max} - \gamma$, wherein $\gamma$ is a positive constant.

33. The invention defined in claim 31 wherein said mapping step includes mapping said average picture element intensities $\bar{\phi}$ according to the relationship $$\phi_T = \gamma + \left(1 - \frac{2\gamma}{\phi_{max}}\right) \bar{\phi}$$

wherein $\gamma$ is a constant.

34. The invention defined in claim 33 wherein $\gamma$ is selected in the range between $\phi_{max}/100$ and $\phi_{max}/10$.

35. The invention defined in claim 33 wherein $\gamma = \sigma \sqrt{2\pi}/2$ and $\sigma$ equals the standard deviation of said picture element intensity values.

36. The invention defined in claim 31 wherein said assigning step further includes the step of modifying said assigned intensity values in accordance with a pattern dependent upon the position of said picture element in said image.

37. A method of displaying an image having a plurality of areas of various intensities on a display device having a plurality of display cells each capable of residing in one of two visual states, including the steps of
associating a particular one of said display cells with a particular one of said areas,
determining the average intensity $\bar{\phi}$ of said particular one of said areas and the areas surrounding said particular area, said average intensity falling within a first range,
constraining said average intensity to a range narrower than said first range, thereby producing a threshold value $\phi_T$, and
actuating said particular one of said display cells if said intensity of said particular one of said areas bears a predetermined relationship to said threshold.

38. The invention defined in claim 37 wherein said constraining step includes constraining said average intensity $\bar{\phi}$ according to the relationship $$\phi_T = \gamma + \left(1 - \frac{2\gamma}{\phi_{max}}\right) \bar{\phi}$$

wherein $\gamma$ is a constant and $\phi_{max}$ is the maximum value of said picture element intensity.

39. The invention defined in claim 38 wherein said average determining step includes the steps of summing said intensities of "n" of said areas and dividing said sum by "n".

40. The invention defined in claim 38 wherein said actuating step includes the steps of comparing said intensity of said particular one of said areas to said threshold, and determining if said intensity exceeds said threshold.

41. The invention defined in claim 38 further including the step of selecting $\gamma$ proportional to the standard deviation of said picture element intensities.

* * * * *